March 22, 1955 — M. WALLACE — 2,704,808
RECEIVER INDICATORS
Filed May 20, 1946 — 3 Sheets-Sheet 1

INVENTOR.
MARCEL WALLACE
BY Hyman Hurwitz
Attorney

March 22, 1955 M. WALLACE 2,704,808
RECEIVER INDICATORS
Filed May 20, 1946 3 Sheets-Sheet 2
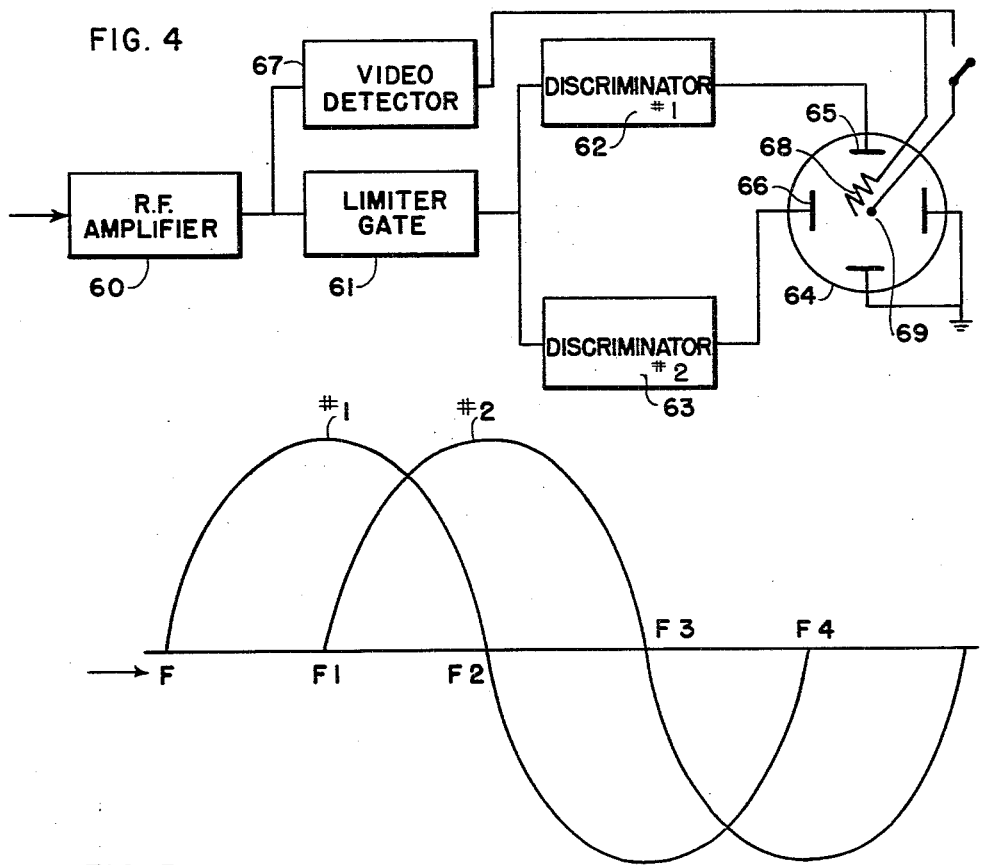
FIG. 4
FIG. 5
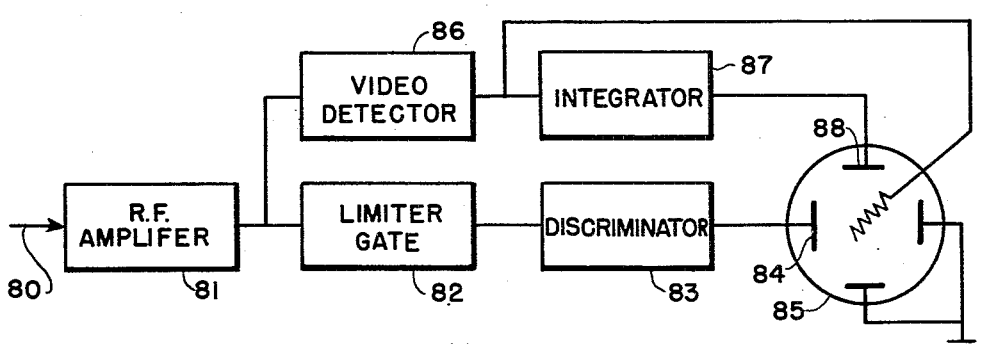
FIG. 6
INVENTOR.
MARCEL WALLACE

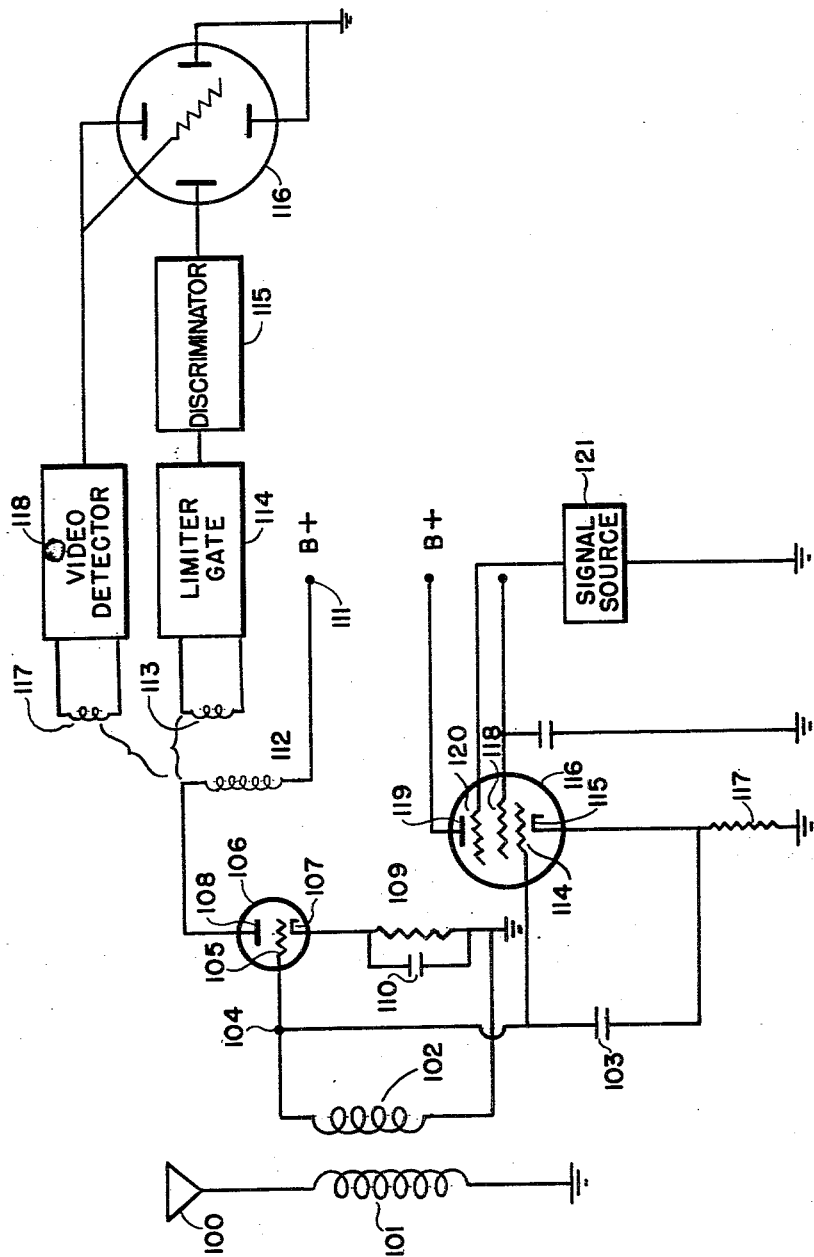

2,704,808
RECEIVER INDICATORS

Marcel Wallace, Fairfield County, Conn., assignor, by mesne assignments, of one-half to said Wallace, doing business as Panoramic Laboratories, East Port Chester, Conn.

Application May 20, 1946, Serial No. 670,892

10 Claims. (Cl. 250—20)

This invention relates to panoramic devices for displaying simultaneously on a cathode-ray indicator a plurality of signals, each of which may be at a different frequency, and relates particularly to devices of this character which either dispense entirely with frequency scanning devices, or dispense with any requirement for synchronizing of the scanning of a band of frequencies to be displayed with respect to the sweep of the beam of the cathode-ray indicator.

In previous types of panoramic devices it has been usual to scan a band of frequencies and to sweep a beam of a cathode-ray indicator in synchronism with the scanning operation. In the present system I provide a deflecting voltage for the cathode-ray beam which is characteristic of and which is determined by the frequency being received, no deflection of the cathode-ray beam taking place in the absence of signal. In particular, should the signals be of random pulse character, each signal as it is received produces a deflection corresponding with its frequency on one coordinate of the coordinate system provided by the screen of a cathode-ray indicator. Signals may be received over a wide band translating system, the possibility of missing signal indications by reason of the fact that the scanning mechanism is not tuned, at any particular instant, to the pulse frequency being received, being entirely obviated.

In a modification of my invention, I disclose an apparatus for displaying continuous signals, as distinguished from pulse signals on a receiving system, which is fundamentally of the above character, by scanning the frequency spectrum within which signals are to be indicated. Frequency scanners in systems of this character may be operated at any desirable rate and in accordance with any desired law of time variation, that is, linearly or non-linearly, and signals are indicated on the face of the cathode-ray indicator in proper locations with respect to a frequency scale as they are tuned in by the scanning mechanism, independently of the rate of scanning or of the law of time variation of scanning. In this type of system the scanning mechanism acts as a frequency gate, the cathode-ray sweep being independent of the rate or the extent of scanning, and being responsive only to the incoming signal frequency itself. Should the receiver be tuned to a given fixed frequency, upon cessation of scanning, presence of a signal at that frequency will be indicated on the face of the cathode-ray indicator in its proper position against a suitable frequency calibrated scale, just as if the instrument were still scanning.

In systems of the above character cathode-ray deflections in accordance with frequency are produced by discriminator circuits responsive to the frequency of the received signals. It will, accordingly, be obvious that by suitable adjustment of the discriminator circuit small variations of frequency of received signals may produce large deviations of the cathode-ray beam, or on the contrary, that relatively large deflections of the received frequency from the signal value to which the discriminator may be tuned may be required to produce appreciable beam deviation.

It is further an extremely simple matter to vary the central frequency of the frequency discriminator by a tuning operation, whereby any desired frequency may be displayed centrally on the cathode-ray screen.

In one embodiment of my invention, I may produce signal pips on the cathode-ray screen at positions corresponding with frequency and having amplitudes corresponding with the amplitudes of received signals. Alternatively, I may intensify the cathode-ray beam in response to the received signals, whereby to produce dot indications on the face of the screen at locations corresponding with the frequency of received signals and without providing signal amplitude indications. I may use various types of coordinate systems in the practice of my invention; in particular, frequency may be displayed on one coordinate and amplitude on another coordinate of a rectangular coordinate system, or I may choose to utilize polar coordinates, frequency being displayed about the circumference of a circle, and amplitudes being displayed in terms of radial deflections from the periphery of the said circle.

It is, accordingly, an object of the present invention to provide a panoramic display device for displaying the character of radiant energy over a relatively wide spectrum of frequencies simultaneously without the necessity for synchronizing the display device with a scanning operation.

It is another object of the invention to provide panoramic display devices utilizing frequency discriminators for producing beam deflections of a cathode-ray indicator.

It is still a further object of the present invention to provide panoramic display devices wherein a linear or non-linear frequency scale may be provided which is independent of scanning rate, or of extent of scanning, when receiving continuous wave or pulsed signals.

It is still another object of the invention to provide, in panoramic display devices, a frequency indicative display which is independent of pulse duration when pulse signals are being received and displayed.

It is still a further object of the invention to provide devices for displaying pulses which occur at random times and at random frequencies, and which are capable of maintaining wide portions of the radio-frequency spectrum under continuous observation, so that signals of short duration and occurring completely at random may be indicated.

Still another object of the invention resides in the provision of panoramic display devices which do not depend upon frequency modulation of a scanning oscillator for operation, whereby extremely wide bands of frequencies may be maintained under continuous observation by relatively simple circuits.

It is still a further object of my invention to provide means for displaying the simultaneous values of a pair of associated frequencies in terms of a single indication on the face of a cathode-ray indicator, by means of a pair of discriminator circuits, each responsive over a distinct band of frequencies within each of which one of the pair of frequencies may fall, the display signals being of pulse or continuous wave character.

It is another object of this invention to provide devices for providing frequency indicative responses about the periphery of a circular trace, or in terms of polar coordinates, by means of an apparatus comprising a pair of relatively detuned discriminator circuits.

Still another object of the invention resides in devices for displaying various pulse properties such as length, or energy, simultaneously for a plurality of pulses at different and distinct frequencies.

It is yet another object of the invention to provide electronic frequency gates, and to utilize such gates in the practice of my invention, and in accordance with the various embodiments thereof.

The above and still further objects and advantages of my invention may be ascertained upon study of the following detailed description of certain embodiments thereof, when taken in conjunction with the accompanying drawings, wherein:

Figure 4 is a further block diagram of the circuit of a display device for indicating frequency values about the circumference of a circle, by utilizing relatively detuned discriminators;

Figure 5 illustrates wave forms, which are useful in connection with the description of the theory of operation of the embodiment of my invention illustrated in Figure 4;

Figure 6 is a block diagram of the circuit of a discriminator type pulse analyzer; and Figure 7 is a circuit diagram of an electronic frequency gate type of panoramic display device.

Figure 1:
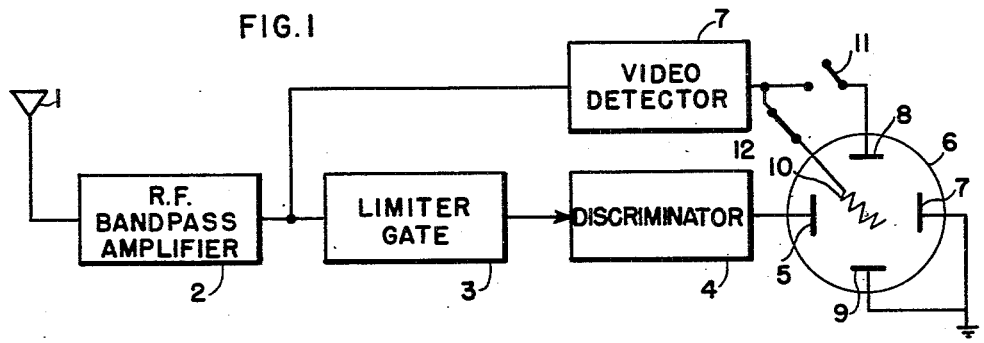
Figure 1 is a schematic block diagram of one embodiment of my invention for displaying the amplitude characteristic of signals over a wide frequency spectrum.

Referring now to the drawings, and particularly to Figure 1 thereof, there is illustrated one type of panoramic device utilizing beam deviations produced by a discriminator, and which is intended particularly for displaying on the screen of a cathode-ray indicator a plurality of discrete pulse signals which are assumed to occur at such time intervals that they do not overlap one upon another, in general, but which may occur otherwise completely at random.

Signal pulses, which may occur anywhere within a predetermined band of frequencies, are received on an antenna 1 and amplified by a radio frequency band pass amplifier 2 capable of passing the said band of frequencies or any predetermined portion thereof. Signals derived from the amplifier 2 are limited in amplitude by a limiter 3 the output of which is coupled to a discriminator 4 which produces output signals of D. C. character and having values determined by the frequencies applied thereto. The discriminator 4 may have a linear frequency characteristic, at least in part, and the said characteristic may have an extent in terms of frequency response equal to or greater than the band pass of the amplifier 2, whereby each received pulse produces an output voltage in the discriminator 4, which has an amplitude corresponding with the frequency of that pulse. The output signals derived from the discriminator 4 are applied to horizontal plate 5 of the cathode-ray indicator 6, the opposing horizontal plate 7 being grounded.

Signals derived from the output of the band pass amplifier 2 are applied directly to video detector 7 which may be followed by a further amplifier, if desired, and the output of which is applied to vertical plate 8 of the indicator 6, the opposing vertical plate being grounded. In this manner each received pulse is caused to produce not only a horizontal deflection of a cathode-ray beam having a magnitude determined by the output voltage of the discriminator 4, but also a vertical deflection visible in the form of a pip and indicative of the amplitude of the signal pulse. If desired, the output of video detector 7 may be applied to an intensifier control 10 instead of to the vertical plate 8, whereby a spot will occur along a horizontal coordinate on the face of the cathode-ray indicator 6 for each received pulse and having a position on that line determined by the frequency of the pulse. Switches 11 and 12 may be inserted in the leads for the plate 8 and the control element 10 to enable selective operation thereof, or if desired, simultaneous operation thereof.

In the embodiment of the invention illustrated in Figure 1 of the drawings, operation is restricted to random pulse reception or, alternatively, to reception of only one frequency at any given instant. Should a plurality of given frequencies be received simultaneously by the antenna 1, an erroneous indication will be produced by the apparatus since the discriminator will produce an output determined by all received frequencies and since the video detector will cause voltage to be applied to the vertical plate 8 having a value determined by the amplitudes of the received plurality of signals. While this property of the embodiment of my invention, illustrated in Figure 1 of the drawings, possesses definite advantage for some applications of my invention, it is necessary to modify the system of Figure 1 should it be desired to indicate simultaneously a plurality of continuous signals on the face of the cathode ray indicator by means of apparatus utilizing my novel principles.

Figure 2:
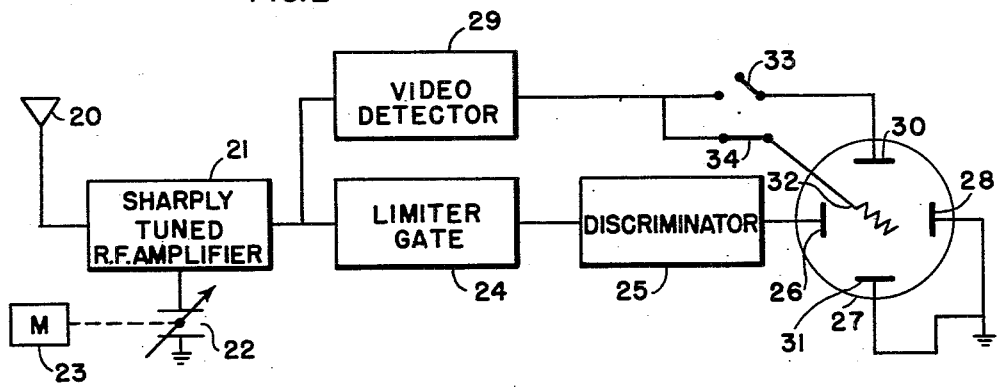
Figure 2 is a block diagram of a further embodiment of my invention and which is provided with a frequency gate for frequency scanning purposes.

Reference is accordingly made to Figure 2 of the drawings, wherein is disclosed a panoramic indicating system providing frequency responsive deviations of a cathode-ray beam, but which is adapted to receive and to indicate simultaneously a plurality of continuous wave signals which may be present simultaneously within a predetermined spectrum.

Signals may be received on an antenna 20 and applied to a sharply tuned R. F. amplifier 21, the tuning of which may be continuously varied to provide frequency scanning over a spectrum which it is desired to monitor, and for purpose of exemplification only I disclose tuning as being accomplished by means of frequency variation of a condenser 22 which may form part of the tuned circuit of the amplifier 21. Capacitance of the condenser 22 may be varied continuously by means of a motor 23 or by any analogous means. The amplifier 21 acts as a frequency gate permitting passage to a limiter gate 24 of only a small portion of the entire spectrum being monitored at any one instant. The limiter 24 serves to remove from received signals any amplitude modulation which may be inherent therein and provides output signals of constant amplitude. The output of limiter 24 may be applied to a frequency discriminator 25 which provides an output voltage determined entirely by the frequency of any signal which may be applied thereto. It will be clear that the scanning action of the amplifier 21 permits the introduction to the discriminator 25 of substantially one frequency or a very narrow frequency band at any given instant and that all frequencies existing within the spectrum of frequencies over which scanning takes place will be applied to the discriminator 25 in sequence. The output of discriminator 25 is applied to a horizontal plate 26 of the cathode-ray indicator 27, the opposing horizontal plate 28 being grounded, and horizontal deflections of the cathode-ray beam are produced at such times only as signals are passed by the amplifier 21, amplitudes of the deflections being determined solely by the frequency values of the passed signal. Signals derived from the output of the amplifier 21 may be detected in a video detector 29 and applied selectively to a vertical plate 30 of the cathode-ray indicator 27, the opposite vertical plate 31 being grounded, or the signals may be applied to an intensifier grid 32. Selection of the mode of operation desired may be accomplished by means of switches 33 and 34, which serve to connect the output of the video detector 29 alternatively to the plate 30 or to the intensifier grid 32.

The action of the embodiment of my invention illustrated in Figure 2, with the vertical plate 30 connected in circuit is as follows. In the absence of received signals the cathode-ray beam produces a spot at the center of the screen. As the signal is tuned in and slowly builds up in amplitude a voltage is built up in the discriminator which may be positive or negative, depending upon the relation of the frequency of the signal to the tuned value of the discriminator. The voltage output of the discriminator increases either positively or negatively, until the signal level reaches the maximum value which may be passed by the limiter 24. At this point the output of the discriminator is determined by the frequency of the signal only and attains a steady value. The signal applied to the vertical plate 30 also builds up gradually as the received signal is being tuned in and will continue to rise until the R. F. amplifier 21 has been tuned to the precise value of frequency of the signal being monitored. After the signal has reached maximum horizontal deflections and as the R. F. amplifier 21 continues to pass through the signal, the output of the video detector 29 will decrease. Assuming that the signal remains constant in frequency and that the R. F. amplifier 21 has a symmetrical frequency characteristic, the increase or decrease of the output of the video detector will be similar. After the value of the signal has decreased, due to the change of the tuning of amplifier 21, to a value below the maximum value of the limiter 24 the discriminator voltage will decrease and the trace will approach the center of the cathode-ray screen.

In Marcel Wallace application for U. S. patent, Serial #663,313 filed April 19, 1946, I have disclosed a panoramic receiving and indicating circuit in which radio frequency signals are scanned synchronously with the deflection of the beam of a cathode-ray indicator and in which a modulation frequency carried by the radio frequency signal may be separated therefrom and applied to a frequency discriminator, the output of the discriminator being impressed upon control elements of the indicator in such manner that two dimensional indications are produced, each indication being representative of both the carrier frequency and the modulation frequency of received signals.

In still a further application for U. S. patent, filed in the name of Marcel Wallace, on May 7, 1946, and to which has been assigned Serial #667,770, I have disclosed still a further panoramic type receiver-indicator for receiving and indicating simultaneously the frequency value of a carrier of an associated modulation signal, or of the frequency of a pair of modulation frequencies associated with a given character. In this system I apply one of the frequencies to be indicated to a suitable discriminator, the output of which controls deflection of a cathode-ray beam in one coordinate and the other signal to a second discriminator, the output of which controls the deflection of the cathode-ray beam in another coordinate. This latter system is applicable particularly for pulse signals and provides accurate indications only for non-overlapping pulses.

I now propose to modify the disclosure of Wallace application Serial #663,313, above referred to, by application thereto of principles embodied in Figure 2 of the present application.

Figure 3:
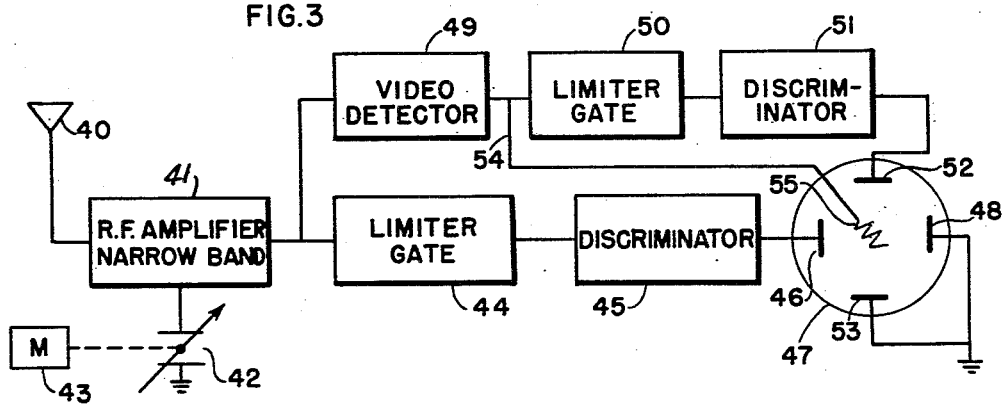
Figure 3 is a block diagram of still another embodiment of my invention for displaying simultaneously in terms of a single indication values of a pair of associated frequencies.

Referring now to Figure 3 of the accompanying drawings, reference numeral 40 denotes an antenna for receiving signals over a predetermined frequency spectrum, the character of the signals, whether discrete pulses or continuous signals, being immaterial. The signals received by the amplifier 40 are applied to a narrow band R. F. amplifier 41 which is tuned continuously over the respective spectrum by means of a variable condenser 42, which is driven by a motor 43. The output of the R. F. amplifier 41 is applied to a pair of channels, one of which serves to provide horizontal deflections and the other of which serves to provide vertical deflections for the beam of the cathode-ray indicator. Located in the first of the pair of channels is a limiter 44 which provides at its output a signal of definite amplitude at a frequency corresponding with that of any signal which may be received by the R. F. amplifier 41 in the course of its scanning operation. The output of the limiter is applied to the frequency discriminator 45 which produces a D. C. voltage having a magnitude and a polarity dependent upon the frequency value of the instantaneously received signal, that voltage being applied to a horizontal plate 46 of a cathode-ray indicator 47, the opposing horizontal plate 48 being grounded.

In the second of the pair of channels signals deriving from the R. F. amplifier 41 are detected in the video detector 49 to remove from the received R. F. carrier any accompanying modulation signal. The output of the video detector 49 may be limited in accordance with the usual practice in a limiter 50, the output of which may be applied to the discriminator 51 for development of a D. C. output voltage having magnitude and polarity dependent upon the frequency value of the modulation signal. The D. C. output of the discriminator 51 may be applied to the vertical plate 52 of cathode-ray indicator 47, the opposing vertical plate 53 being grounded.

The beam of the cathode-ray indicator 47 may be normally de-intensified and signals derived from the video detector 49 may be applied via a lead 54 to intensity control grid 55 of the cathode-ray indicator 47 to cause production of visible indications only upon reception of signals by the amplifier 41.

It will be clear from the foregoing description that the embodiment of my invention which is disclosed in Figure 3 of the accompanying drawings provides a dot indication on the face of the cathode-ray indicator for each frequency which may pass through the scanning amplifier or frequency gate 41 and that the horizontal deflection of that dot will be a function of the carrier frequency of the signal, the vertical deflection of the dot being a function of the frequency of a modulation signal which may be carried by the same R. F. signal.

It will be apparent that should it be desired to analyze a pair of discrete modulation frequencies occurring on a signal carrier, that the system of Figure 2 of Marcel Wallace application for U. S. patent Serial No. 667,770 may be utilized for this purpose. Should the signal character in such case be of continuous rather than of pulsed character, it will be possible to apply the principles disclosed in Wallace application for U. S. patent Serial No. 667,770 by the simple expedient of frequency scanning the R. F. amplifier thereof in the manner disclosed in Figure 3 of the drawings accompanying the present application. While such a modification does not permit identification of the pair of modulation frequencies with any specific carrier there are many applications of my invention which do not require such identification.

In still a further embodiment of my invention I provide a signal display on the face of a cathode-ray indicator in terms of polar coordinates, rather than in terms of rectangular coordinates, as was true in the embodiments of Figures 1–3, inclusive; and I may utilize the further embodiment for the reception and indication of discrete non-superimposed pulse signals and for the reception of continuous wave signals, the latter requiring the use of a scanning frequency gate of the character disclosed in Figures 2 and 3 of the drawings.

Referring now to Figure 4 of the accompanying drawings, I disclose an R. F. amplifier 60, which may derive signals from any desired source of signals, such as a radio frequency antenna. The amplifier 60 may be a scanning frequency gate, if desired, or a wide band translator, depending upon the type of signals it is desired to receive, and recalling that while the wide band amplifier is applicable to the reception of pulse signals only, that the use of a scanning frequency gate is applicable to the reception of signals of any character, whether pulse or continuous signal.

The output of the amplifier 60 may be applied by means of a limiter 61, to a pair of frequency discriminators 62 and 63, in parallel, and which are detuned one with respect to the other, the characteristics being substantially of the character illustrated in Figure 5 of the drawings.

Referring now specifically to Figure 5 of the accompanying drawings, there is disclosed a pair of discriminator characteristics, #1 and #2, associated with discriminators 62 and 63 of Figure 4, and which are of common and well known character. The characteristics #1 and #2 overlap in such fashion that the positive peak of characteristic #2 coincides with the zero point of characteristic #1, and so that the negative peak of characteristic #1 coincides with the zero point of characteristic #2. The shapes of the characteristics should as nearly as possible approach that of a sine wave. Under the conditions stated, and assuming that successive zero points of curve #2 are at frequencies $f_1$ and $f_3$, and that successive zero points of curve #1 are at frequencies $f_2$ and $f_4$, it will be clear as the incoming frequency varies between frequencies $f_1$ and $f_4$, inclusive, these frequencies being at the extreme limits of the spectrum under analysis, that the beam of the cathode-ray indicator 64 will trace out a circle on the indicator screen.

The output of the R. F. amplifier 60 may be detected in the video detector 67, the output of which may be applied to the intensifier grid 68 of the indicator 64, that grid being maintained, in the absence of signals, at a potential such that no spot is visible on the face of the indicator. In the presence of signals the beam is deflected to take a position about a circle which is representative of the frequency of an incoming signal, the spot being simultaneously intensified to produce a visible indication. I may, if desired, impress the output of the detector 67 on a polar electrode 69 to afford radial spot deflections which are proportional to signal amplitudes.

I may utilize the discriminator type of panoramic display producing system for the simultaneous display of a series of pulse sequences, each of the series being indicated on one coordinate of a coordinate system for representing frequency of pulse carrier, and against a further coordinate of a coordinate system for representing pulse duration. In this type of system I may provide a discriminator type deflecting system for providing a horizontal beam deflection in response to each received pulse, which is a measure of the frequency of that pulse, and a vertical beam deflection which is produced as a measure of the integrated value of the pulse area. In the case of rectangular pulses, integration of the pulse provides a voltage which rises with a uniform slope, and which is accordingly adapted for utilization as a linear sweep voltage in cathode-ray oscilloscopy.

Display of pulses in accordance with systems of the above character provides many advantages over systems previously envisaged in the art. In particular, selected pulses may be centered on the cathode-ray screen for study by the simple expedient of adjusting the tuning of the frequency discriminator. A pulse sequence, if composed entirely of pulses of a single frequency, may be caused to produce a sharp line on the screen, and in the event successive pulses of a series originating at the same source vary in frequency, that fact will be readily evident in terms of a widening of the sharp line display. Still further, should the pulse be of non-rectangular character, the pulse display will provide a measure of pulse energy, rather than of pulse duration, which for many applications of pulse measuring techniques is of primary importance.

Reference is now made to Figure 6 of the drawings wherein is displayed a block diagram of a system for the display of pulse frequency against pulse length or pulse energy. Pulsed carriers which may occur at any point within a predetermined frequency spectrum are applied over lead 80 to the R. F. amplifier 81, which may be of wide band character, at least coextensive with the spectrum of frequencies it is desired to monitor. Discrete and non-superimposed pulses derived from the output of the amplifier 81 are applied to a limiter 82, the output of which is detected in a frequency discriminator 83, and applied to horizontal plate 84 of cathode-ray indicator 85. The discriminator 83 may be tunable in frequency and adjustable in respect to its slope, $$\frac{dc}{df}$$

that is in respect to the change in output voltage produced by a change in input frequency. The tunability of the discriminator 83 enables any desired pulse to be centered on the face of the cathode-ray indicator 85, and the slope adjustment enables increase of resolution with respect to pulses on adjacent frequencies.

The output of the R. F. amplitude 81 may be applied to a video detector 86, which enables derivation from the received pulse carrier of a video pulse, which may be integrated in the integrating circuit 87 and applied to the vertical plate 88 of the indicator 85, to provide a sweep circuit therefor. This sweep circuit will vary linearly, should the received pulses be rectangular in shape, and will have a total duration equal to that of the integrated pulse. Should the pulse be of irregular shape the sweep voltage derivable from the integrator 87 will vary non-linearly, in general, and its maximum value will provide a measure of total pulse energy, and will be translated as a vertical deflection on the face of the cathode-ray indicator.

My novel pulse analyzing circuits may be utilized for measuring time between pulses by the expedient of inserting between the video detector 86 and the integrating circuit 87, an Eccles-Jordan type of flip-flop circuit. As is well known, circuits of the Eccles-Jordan type produce square wave outputs, the square wave being initiated by the first of a pair of pulses and terminated in response to the second pulse of the pair. In a system of this character, it will be obvious that only pulse separation times between pulses of a homogeneous sequence of pulses will be of interest, and accordingly the use of a wide band R. F. amplifier 81 will be practical only if a single pulse sequence is being received. In the event it is desired to obtain pulse separation measurements on a plurality of carrier frequencies simultaneously, I may utilize a narrow band frequency gate type of R. F. amplifier at 81, and such as is disclosed in Figures 2 and 3 of the accompanying drawings.

It is often of interest to determine pulse duration of pulses having irregular amplitudes. This may be readily accomplished by the simple expedient of inserting a limiter between the video detector 86 and the integrating circuit 87, whereby any amplitude variations in the received pulses may be removed, and a level amplitude pulse applied to the integrator 87. Under such circumstances the total length of vertical trace will be a measure of pulse duration, whether or not the pulses are of constant amplitude.

It will be clear, in respect to each of the disclosed embodiments of my invention, that I may, by the simple expedient of varying the level at which limiting takes place, vary in similar manner the total deflection which is produced at any given frequency, thereby either reducing or extending the total frequency width of the scale, and it is intended that each of the limiters utilized in the practice of my invention shall be adjustable in respect to its limiting level.

I also desire to utilize tunable discriminators, in the practice of the various embodiments of my invention, whereby to enable displacement of indications, it being clear to those skilled in the art that, considering the embodiment of my invention illustrated in Figure 1 of the accompanying drawings as exemplary, any tuning of discriminator 4 will produce a corresponding spot or pip deflection.

As a further modification of each of the embodiments of the invention disclosed in the present application and which utilize frequency gates, I may utilize amplitude gates as limiter circuits, and which pass signals occurring only with a predetermined and relatively narrow range of amplitudes. The adoption of this expedient is of course of value generally in the practice of my invention and in conjunction with each of the disclosed species, but is of particular value in conjunction with the embodiments of my invention wherein I utilize a frequency gate, since thereby undesired indications occurring during signal build up may be avoided, and I accordingly define the term "limiter" as utilized in this specification and in the accompanying claims, as an amplitude gate, capable of passing signals between a predetermined and selectable range of amplitude values only, the lower of the values being zero, if desired.

I have shown a frequency gate of the simplest type, in connection with the various embodiments of my invention disclosed in the present application. I realize, however, that various types of frequency gates may be utilized in the practice of my invention, and which may be more advantageous than the specific form of frequency gate which I have suggested.

In particular, I have found it advantageous to utilize an electronic frequency gate, of the character disclosed in the U. S. Patent #2,323,598, issued in the name of J. L. Hathaway, on July 6, 1943, on application #373,470, filed January 7, 1941.

Reference is now made to Figure 7 of the accompanying drawings for a circuit diagram illustrating the application of the disclosure of the Hathaway Patent, heretofore referred to, to panoramic display systems.

Radio frequency signals are received over the antenna 100, and transferred by induction from the primary coil 101, connected in series with the antenna 100 to a secondary coil 102, which forms one element of a tuned circuit, the capacitive element of which comprises a capacitance 103. One terminal of the coil 102 is grounded, the other terminal 104 being connected to the control grid 105 of an amplifier tube 106, having a cathode 107 and a plate 108. The tube 106 is self-biased by means of a resistor 109 by-passed by a shunt connected capacitor 110. The plate 108 is supplied with positive potential of suitable value, from a terminal 111, and is connected in series with a primary 112 of a coupling transformer having a secondary 113.

Connected across the condenser 103 is a grid 114 and cathode 115 of a pentode vacuum tube 116, the cathode 115 being connected to ground via a resistance 117, which is unby-passed. The screen grid 118 of the tube 116 is supplied with suitable steady operating potential, in known fashion, as is also the plate 119. The grid 120, however, is connected to a source of signal 121, at some convenient and relatively low frequency, such as 60 cycles per second, and at an amplitude sufficient to accomplish a very substantial cyclic modification of the mutual conductance of the tube 116. It is shown in the above refered to Hathaway patent, that the effective reactance $X_c$ of the condenser 103, when connected in the circuit illustrated in Figure 7 of the accompanying drawings, is $$X_T = X_c(1+gR)$$

where R is the value of resistance 117 and $g$ the mutual conductance of the tube 116, and it has been found that variations in capacity of 85% to 90% may be accomplished, with proper choice of circuit constants.

Variation of the effective capacitance of the condenser 103 provides variation of the tuning of the input circuit of the tube 106, and thereby a frequency gate suitable for utilization wherever a frequency gate may be required, in the various embodiments of my invention.

The voltage induced in the coil 113, may be limited or amplitude gated in a limiter 114, frequency detected in a discriminator 115 and utilized as a horizontal deflection voltage for the cathode-ray oscilloscope 116.

The coil 112 is further coupled to the coil 117 for transfer thereto of R. F. energy, the latter being detected in video detector 118, and after suitable amplification if desired, may be applied to impress vertical deflection voltages and/or intensification voltages on the cathode-ray indicator 116.

While I have disclosed various embodiments of my invention, it will be clear that modifications of the said embodiments may be resorted to, both in respect to the general arrangement of the circuits and the choice of elements, without departing from the spirit of the invention, which is particularly pointed out in the appended claims.

What I claim and desire to secure by Letters Patent of the United States is: :

1. A display system for pulse signals occurring at various frequencies and at various times in a predetermined frequency spectrum, comprising, a translation channel for said signals, said translation channel having an output circuit, a limiter and frequency discriminator coupled in cascade to said output circuit to receive signals therefrom, a visual indicator for providing voltage responsive deflectable visual indications in at least two coordinate directions, means for deriving first voltages from said frequency discriminator representative of only the frequencies of said signals, means for applying said first voltages to said visual indicator to actuate said visual indications in one of said coordinate directions, means for deriving further voltages representative of a pulse shape characteristic of said signals directly from said translation channel, and means for applying said further voltages to said visual indicator to actuate said visual indication in another of said coordinate directions.

2. A display system for visually displaying the carrier frequencies and carrier modulation frequencies of a plurality of modulated carrier waves dispersed in a predetermined relatively wide frequency band, comprising, a relatively narrow band frequency scanning filter means for translating said carrier waves in time succession in accordance with the frequencies of said carrier waves, a first relatively wide frequency band frequency discriminator coupled in cascade to said frequency scanning filter means, means for detecting the modulations of said modulated carrier waves when translated by said frequency scanning filter means, a second frequency discriminator coupled to said means for detecting or measuring the frequencies of said modulations, and indication means responsive to output voltages derived from said first and second frequency discriminators for indicating the frequency of each of said carrier waves and of the modulation thereof.

3. In combination, in a system for indicating the frequency and a further information bearing characteristic of each of a plurality of pulse modulated wave energy signals occupying positions within a predetermined frequency spectrum, a channel for passing all said signals, said channel having an output circuit, an amplitude limiter coupled to said output circuit for limiting the amplitudes of all said wave energy signals, a frequency discriminator coupled to said amplitude limiter for providing first voltage outputs of different magnitudes in response to wave energy signals of different frequencies, a pulse amplitude detector coupled to said output circuit for deriving further voltage outputs representative of the modulations of said signals, and means for indicating the first and further voltage representative of each of said modulated wave energy signals as a unitary indication in separate coordinate directions representative separately of said first and further voltages.

4. In combination, a signal translating channel capable of passing a plurality of pulsed information bearing signals, a limiter gate for said signals coupled to said translating channel, a frequency discriminator circuit for said signals coupled to said limiter gate, a visual indicator adapted to produce simultaneous visual indications in at least two coordinates, means responsive to the output of discriminator for providing said indication of pulse carrier only in one of said coordinates, means for deriving further information bearing signals indicative of pulse shape of said pulsed signals directly from said translating channel, and means for actuating said indicator in another of said at least two coordinates to provide further visual indications responsive to said last mentioned information bearing signals.

5. The combination in accordance with claim 1 wherein said means for deriving said further voltages comprises a further frequency discriminator.

6. The combination in accordance with claim 1 wherein said characteristic of a signal is pulse duration.

7. The combination in accordance with claim 1 wherein said characteristic is signal amplitude.

8. A visual display system for a plurality of wave signals occurring at random in a predetermined relatively wide frequency spectrum, comprising, a frequency discriminator circuit having a response characteristic extending over said predetermined frequency spectrum and a different response for each frequency of said spectrum, a frequency scanning relatively narrow band frequency gate having an output circuit, said gate periodically tunable over said relatively wide frequency spectrum for transferring said signals in succession in said output circuit, means coupling said output circuit to said frequency discriminator circuit, a visual indicator responsive to the responses of said discriminator circuit to provide visual indications, means for applying said responses of said discriminator circuit to said visual indicator, means for deriving signals from said output circuit in response to each concurrence of the frequency of said gate and the frequency of one of said continuous wave signals, and means for applying said last named signals to said visual indicator, said visual indicator comprising a cathode ray tube device having means for generating a visual indication and means for deflecting said visual indication in two coordinate directions, and wherein said last named signals are applied to effect deflecting of said visual indication in one of said two coordinate directions and said responses of said frequency discriminator circuit are applied to deflect said visual indication in the other of said two coordinate directions.

9. A display system for amplitude modulated carrier signals occurring at various frequencies, in a predetermined frequency spectrum, comprising, a translation channel for said signals, said translation channel having an output circuit, a limiter and frequency discriminator coupled in cascade to said output circuit to receive signals therefrom, a visual indicator for providing voltage responsive deflectable visual indications, means for deriving first voltages from said frequency discriminator representative of the frequencies of said carrier signals, means for applying said first voltages to said visual indicator to deflect said visual indications in a first coordinate direction, means for deriving further voltages representative of the amplitude modulation of said signals from said translation channel only, and means for applying said further voltages to said visual indicator to deflect said visual indications in a second coordinate direction.

10. A display system for signals having a frequency characteristic and a further characteristic, said signals occurring at various frequencies in a predetermined frequency spectrum, comprising, a frequency scanning translation channel for said signals, said translation channel having an output circuit, a limiter and frequency discriminator coupled in cascade to said output circuit to receive signals therefrom, a visual indicator for providing voltage responsive deflectable visual indications, means for deriving first signals from said frequency discriminator representative of the frequencies of said signals, means for applying said first signals to said visual indicator to deflect said indications in a first coordinate direction, means for deriving further signals representative of said further characteristic of said signals from said translation channel only, and means for applying said further voltages to said visual indicator to deflect said indications in a further coordinate direction to an extent representative of said further characteristic.

References Cited in the file of this patent

UNITED STATES PATENTS

| | | |
|---|---|---|
| 2,215,197 | Sherman | Sept. 17, 1940 |
| 2,243,214 | Krauth | May 27, 1941 |
| 2,273,914 | Wallace | Feb. 24, 1942 |
| 2,369,585 | Lyman | Feb. 13, 1945 |
| 2,408,742 | Eaton | Oct. 8, 1946 |
| 2,426,189 | Espenschied | Aug. 26, 1947 |
| 2,429,229 | Koenig, Jr. | Oct. 21, 1947 |
| 2,479,208 | Byrne et al. | Aug. 16, 1949 |
| 2,485,620 | McCoppin | Oct. 25, 1949 |
| 2,499,995 | Heller | Mar. 7, 1950 |
| 2,538,068 | Williams | Jan. 16, 1951 |
| 2,581,847 | Espenschied et al. | Jan. 8, 1952 |

FOREIGN PATENTS

| | | |
|---|---|---|
| 101,039 | Australia | May 27, 1937 |
| 113,637 | Australia | Aug. 21, 1941 |